United States Patent [19]

Coscia et al.

[11] Patent Number: 4,460,429

[45] Date of Patent: Jul. 17, 1984

[54] APPARATUS FOR MANUFACTURING FOIL SHAPES HAVING A CAST PLASTIC CAP

[75] Inventors: Charles M. Coscia, Upper Arlington; W. Raymond Wirick, Sunbury, both of Ohio

[73] Assignee: The D. L. Auld Company, Columbus, Ohio

[21] Appl. No.: 411,718

[22] Filed: Aug. 25, 1982

[51] Int. Cl.[3] .......................... B29C 5/00; B32B 31/18; B41M 3/00

[52] U.S. Cl. .................................... 156/384; 156/209; 156/219; 156/242; 156/245; 156/246; 156/247; 156/267; 156/277; 156/380.9; 156/500; 156/510; 156/535; 264/132

[58] Field of Search ............... 156/242, 245, 231, 219, 156/209, 267, 277, 379.6, 384, 389, 390, 500, 510, 246, 248, 380.9, 535; 264/132, 212, 299

[56] References Cited

U.S. PATENT DOCUMENTS

| | | | |
|---|---|---|---|
| 3,114,597 | 12/1963 | Lee . | |
| 3,246,066 | 4/1966 | Gits | 264/132 |
| 3,431,889 | 3/1969 | Fraatz | 118/315 |
| 3,654,062 | 4/1972 | Loew | 156/245 |
| 3,725,112 | 4/1973 | Hansen | 428/203 |
| 3,875,893 | 4/1975 | Riley et al. | 118/216 |
| 3,877,371 | 4/1975 | Jaffa | 156/389 |
| 4,034,708 | 7/1977 | Fielder et al. | 118/642 |
| 4,087,570 | 5/1978 | Beinbrech | 427/44 |
| 4,100,010 | 7/1978 | Waugh | 156/242 |
| 4,139,654 | 2/1979 | Reed | 427/44 |
| 4,292,827 | 10/1981 | Waugh | 72/46 |
| 4,332,074 | 6/1982 | Auld et al. | 264/132 |
| 4,356,617 | 11/1982 | Coscia | 264/132 |

*Primary Examiner*—Caleb Weston
*Attorney, Agent, or Firm*—Biebel, French & Nauman

[57] ABSTRACT

An apparatus for forming foil shapes having a cast plastic cap such as decorative inlays, emblems or automobile body side moulding wherein the apparatus comprises (a) means for advancing a continuous foil member along a horizontal path,
(b) means for cleaning and priming at least one surface of the foil member,
(c) means for providing an adhesive composition to one surface of the foil member,
(d) means for affixing a release liner to the surface of the foil member provided with adhesive,
(e) means for printing the foil member with a plurality of decorative patterns in one or more colors,
(f) means for embossing said foil member in registry with the decorative patterns,
(g) means for cutting foil shapes from the foil member in registry with the decorative patterns,
(h) means for casting a clear fluent plastic material onto the foil shapes, and
(i) means for curing or otherwise hardening the plastic.

14 Claims, 4 Drawing Figures

APPARATUS FOR MANUFACTURING FOIL SHAPES HAVING A CAST PLASTIC CAP

BACKGROUND OF THE INVENTION

The present invention relates to an apparatus for manufacturing foil shapes having a cured plastic layer over a decorative surface; and, more particularly, to an apparatus for manufacturing decorative inlays and ornamental emblems, plaques, panels and moulding containing the same.

Various processes for forming decorative inlays, emblems and the like are known. In particular, in one line of processes, inlays are formed by casting a clear fluent polyurethane onto the surface of an array of foil shapes each having an indicia bearing upper surface, an adhesive carrying bottom surface and a sharply defined peripheral edge. The polyurethane flows to the sharply defined peripheral edge, which is typically formed by die-cutting the foil shape from a sheet and stops and forms a positive meniscus. The polyurethane is cured to provide a weather-resistant cap while the foil shape is maintained flat and horizontal. The radiused edges of the cap give it a lens effect which optically enhances the underlying decoration. One such process is disclosed in U.S. Pat. No. 4,100,010 to Waugh. Decorative inlays formed by this process are typically inserted into a bezel to produce a medallion or plaque. One of the principal applications for these medallions and plaques is in the automobile industry where they are used to display the various trademarks of the manufacturer. For this application, the plaques and emblems must be able to pass certain industry standards for weather-resistance, impact-resistance and resistance to sunlight.

The previous practice for manufacturing decorative inlays and emblems has been to purchase foil sheets pre-coated with adhesive, with the release liner attached, which are preprinted with decorative patterns in an array. No apparatus is available which starts with a continuous foil member (e.g. a roll), coats it with adhesive, applies a release liner, prepares the surface to be printed by cleaning and priming, prints one surface with decorative patterns, embosses the printed patterns, and then cuts foil shapes from the foil and casts them with a clear plastic cap. Furthermore, no apparatus is available which integrates the assembly of the cast plastic capped inlay with the bezels and mouldings in which they are typically mounted. In most cases, the foil members are prepared by one manufacturer, the bezels and moldings are manufactured by another manufacturer, and the two are finished, coated and assembled by a third manufacturer thus making the overall manufacture of the inlay, plaque or emblem economically and productively inefficient.

Thus there is a need for an apparatus which integrates the foregoing activities into a single manufacturing line wherein foil shapes can be prepared, cast with plastic, and cured, and assembled with bezels and mouldings.

SUMMARY OF THE INVENTION

It is one object of the present invention to provide a fully integrated apparatus for the manufacture of decorative inlays, emblems and the like (hereafter foil shapes) wherein the shapes are formed by a process wherein a foil member is provided on one surface with an adhesive and release liner and printed with decorative patterns on the opposite surface, foil shapes are cut from the foil member in registry with the pre-printed patterns, and those shapes are cast with fluent plastic and the plastic is cured.

It is another object of the present invention to provide an apparatus wherein inlays formed by the aforementioned process are assembled with bezels or mouldings manufactured on the same line.

Thus, one embodiment the present invention provides is an integrated apparatus for forming foil shapes cast with a plastic cap which comprises as its essential elements:

(a) means for advancing a continuous foil member along a horizontal path, (b) means for providing an adhesive composition on one surface of the foil member, (c) means for applying a release liner to the surface provided with adhesive, (d) means for cleaning and priming the surface of the foil member to be printed, (e) means for printing the foil member with a plurality of decorative patterns in one or more colors, (f) means for embossing the foil member in registry with the printed patterns, (g) means for cutting foil shapes from the foil member in registry with the decorative patterns, (h) means for casting a clear fluent plastic material onto the foil shapes, and (i) means for curing or otherwise hardening the plastic.

In addition, the present invention also provides an embodiment wherein the aforementioned apparatus additionally comprises (i) means for assembling decorative inlays prepared using the above apparatus with the bezels and moldings.

Thus, in accordance with one embodiment the apparatus of the present invention can be used to produce foil shapes such as decorative inlays assembled with a base member such as a bezel or emblem, and in accordance with a second embodiment it can be used to produce the inlay itself apart from any assembly with the base member.

The invention apparatus is particularly useful in the manufacture of automobile body side trim as it has the capacity to produce elongate foil shapes on a continuous basis. In contrast to prior art techniques wherein the foil member is supplied in the form of a discontinuous pre-printed and pre-coated sheet, the apparatus of the present invention works on a continuous foil web supplied from a foil roll thereby making it possible to form decorative strips of any length desired.

DETAILED DESCRIPTION OF THE INVENTION

The term "foil member" as used herein includes metal foils, plastic foils (e.g. Mylar), metallized plastic foils and paper-backed foils.

Figure 1:
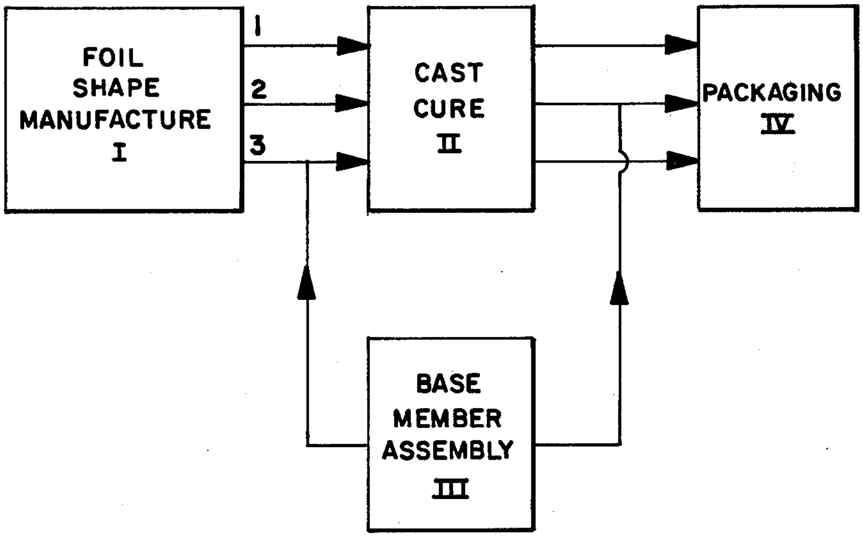
FIG. 1 is a block diagram of the operation of the apparatus of the present invention.

The operation of the invention apparatus is diagrammed in FIG. 1 and comprises four operations: (I) foil shape manufacture, (II) cast/cure of the plastic cap, (III) base member manufacture (optional), and (IV)

packaging. Three basic manufactures are shown as lines 1, 2 and 3, respectively.

Foil shape manufacture (I) starts with a foil member and advances it through the invention apparatus where an adhesive and release liner is applied to one surface and the other surface is cleaned, primed, printed and embossed with a decorative pattern. Thereafter shapes are cut from the foil member in registry with the decorative patterns.

The foil shape is left on the release liner after removal of the cutting selvage. In one embodiment of the invention, illustrated by line 1 in FIG. 1, shapes cut from the foil member are carried on the release liner to a cast-cure station II where they are coated with a clear fluent plastic material. Using appropriate techniques discussed below, plastic cast onto the shapes flows to the sharply defined edge of the shape, and stops, and builds up a positive meniscus. The plastic is then cured or otherwise hardened to form an impact-resistant and weather-resistant cap having radiused edges which provides a lens effect to the underlying decoration. Thereafter, in accordance with embodiment 1, the shapes are transported to packaging station (IV) where the release liner may be slit, or the shapes may be stored on a roll.

In the embodiment illustrated by line 2 shapes exiting the cast-cure station II are assembled with a base member at station III such as a strip of moulding or a bezel. Shapes coming from the cast-cure station (II) are stripped from the release liner and fixed to the base member via an adhesive layer applied at station (I). As part of the base member assembly (III), the backside of the base member may be provided with adhesive for affixing the bezel or moulding to a surface such as an automobile body and a release liner. Thereafter the assembled shapes are packaged at (IV). When the base member is provided with adhesive as part of this manufacture, a release liner is generally used to protect the adhesive prior to installation.

The third embodiment illustrated in FIG. 1 (line 3) differs from the first two in that the shape is inserted into a base member at (III) before the cast-cure operation. In accordance with this embodiment, foil shapes (not having a plastic cap) are removed from the release liner, inserted into a cavity or channel in the base member at (III), and then cast with plastic. The plastic coats the shape and fills the cavity or channel in the base member, thereby encapsulating the foil shape in the base member. Thereafter the cast plastic is cured and the shapes are packaged.

Figure 2:
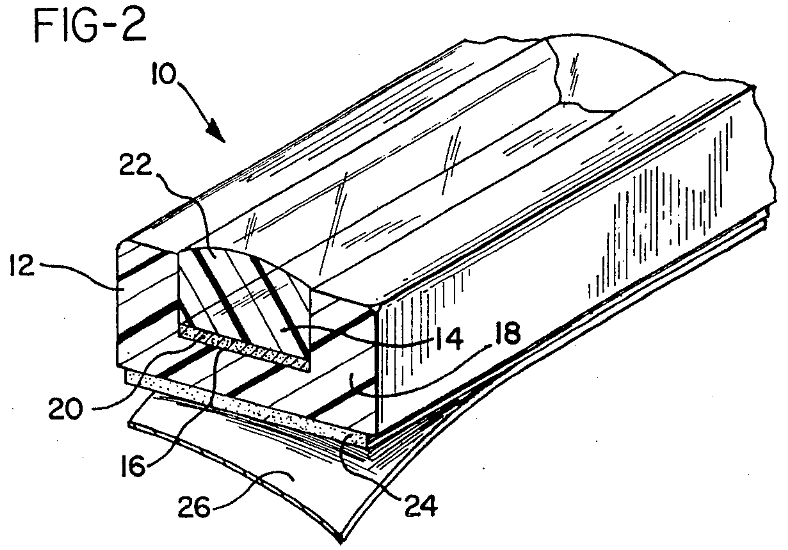
FIGS. 2 and 3 are examples of decorative shapes produced in accordance with the present invention.

A typical example of body side moulding manufactured by casting plastic directly into the channelled base member is shown in FIG. 2. There a trim strip 10 comprises an elongate moulding 12 which is preferably a heat and impact resistant plastic such as acrylonitril-butadiene-styrene terpolymer (ABS), polyvinyl chloride (PVC), nylon (polyamide), polycarbonate, acrylonitril-styrene copolymer, etc. Moulding 12 is preferably formed by extrusion of one of the aforesaid plastics with a channel 14 molded therein, but other processes such as injection molding may also be used. Channel 14 comprises a floor 16 and side walls or shoulders 18 for retaining cast plastic. A decorative foil shape 20 is placed in the channel 14. The foil shape 20 may take various forms, for example, it may be a plastic foil strip which is printed or silk-screened with a decorative design. An adhesive provided on the back of the foil shape may be used to bond the foil member 20 to the floor 16 of channel 14. The foil member 20 is overcoated with a deposit of cast plastic 22. The cast plastic 22 is such that it forms a positive meniscus in channel 14 which provides a trim having radiused edges which provides a lens effect for example by enhancing the appearance of the foil member 20 when viewed from above or at an angle to the trim strip.

The trim strip 10 is secured to the side body of an automobile with an adhesive composition 24 on the base of the strip. Prior to installation the adhesive is protected with a release paper or film 26 such as wax paper or silicone release paper.

The present invention includes both apparatus for forming the capped plastic shapes themselves and shapes assembled with the base member. An example of a foil shape for use as body side moulding that can be manufactured using the invention apparatus is shown in FIG. 3.

Figure 3:
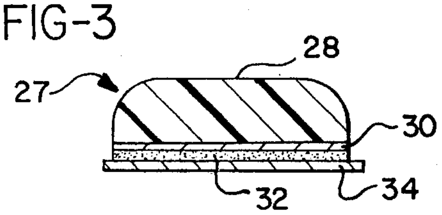

As shown in FIG. 3, the inlay 27 is made up of a decorated and usually embossed foil shape 30 which carries on the decorated or indicia bearing graphic surface thereof a clear, plastic overlay 28 having radiused edges. The foil shape is provided with a layer of adhesive 32 (generally pressure-sensitive) which is accessed by removing a release liner 34. It is particularly advantageous to form the overlay 28 in FIG. 2 of a soft, flexible polyurethane as the trim can be rolled up and supplied directly to the automobile owner as part of a customizing kit. With the flexible overlay, the trim strip conforms to the curvature of the automobile body.

The apparatus of the present invention will now be described in more detail by reference to FIG. 4. A foil member 36 and a release liner 38 are supplied to the invention apparatus from supplies rolls 42 and 44 mounted at station 40. From station 40 the foil member 36 and the release liner 38 are conducted via a series of guide rolls (not shown) to station 46 wherein the upper surface of the foil member is cleaned, dried and primed and the lower surface of the foil member is provided with an adhesive.

Specifically, station 40 comprises a fountain or spray means 48 for spraying the upper surface of the foil member with a cleaning solution such as an alkaline detergent. After passing under means 48, the surface of the foil member contacts a felted roll or similar means (not shown) where the surface is wiped to remove the cleaning solution and surface contamination.

Station 46 includes a means 52 for applying a primer solution to the upper surface of the foil member. Means 52 may take the form of a spray coater, a roll coater, or the like.

After being coated with the primer at 52, the foil member is guided over an adhesive applicator 54. Again, various applicator means may be used to apply the adhesive to the foil member such as a spray coater as shown in FIG. 4 or a roll coater or the like. The adhesive may also be supplied on a transfer sheet in which case the transfer sheet becomes the release liner by contacting the foil member with the adhesive-carrying surface of the transfer sheet using a slight pressure such as by passing the combination through a low pressure nip formed between two rolls. Still another technique is to apply the adhesive as a double sided tape and to contact the exposed surface of the adhesive tape with a release liner supplied from another roll. In accordance with this embodiment, the supply station 40 would be equipped with a third supply roll carrying the double sided tape.

Figure 4:
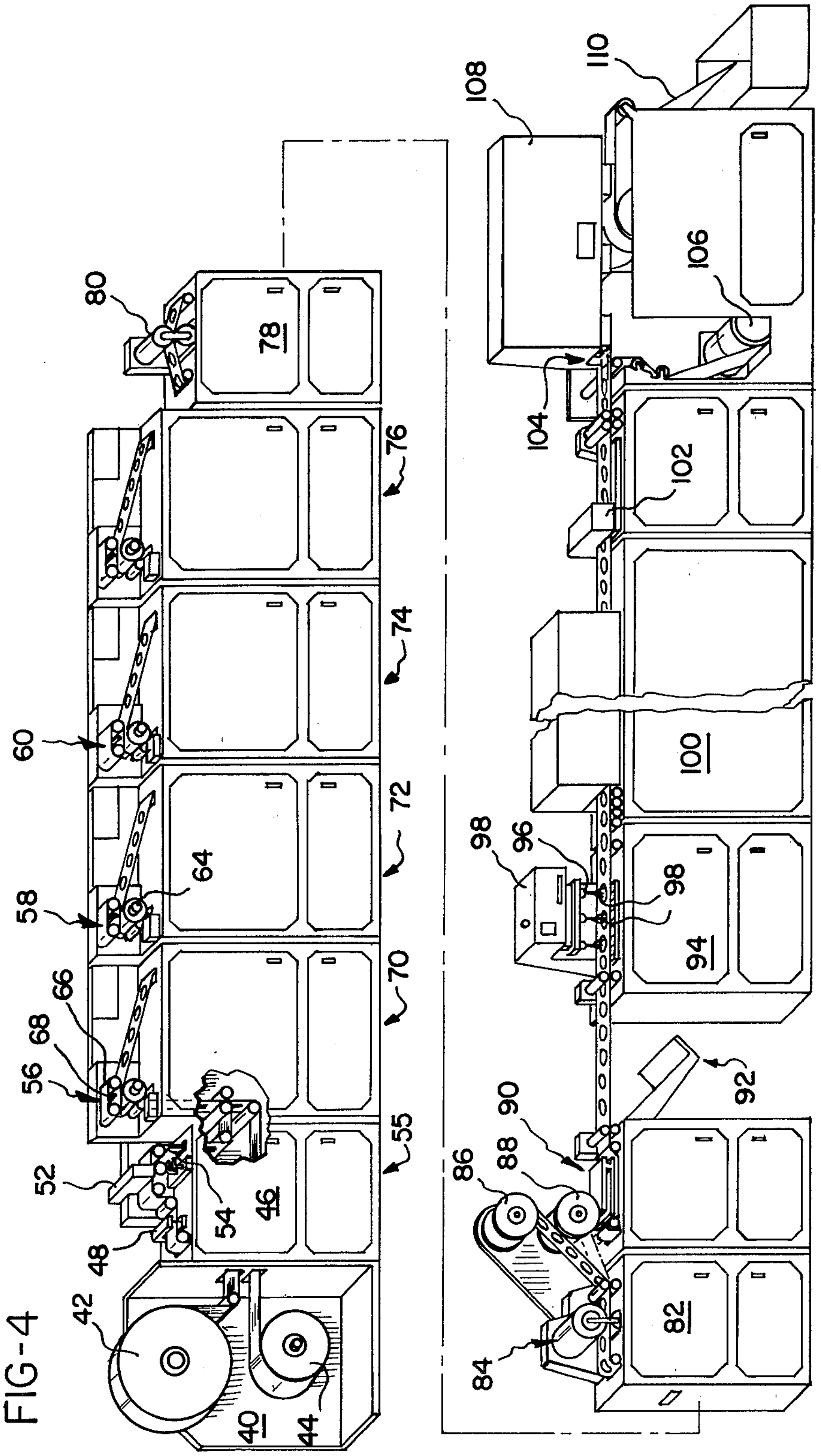
FIG. 4 is a schematic view of one apparatus in accordance with the present invention.

While the adhesive is preferably applied prior to printing, as illustrated in FIG. 4, the two operations may be reversed and the foil member may be printed prior to application of the adhesive. In FIG. 4 after being coated with the adhesive at applicator 54, the foil member is conducted through a dryer 55 located internally of station 46. Upon conclusion of the drying operation, the foil member 36 is assembled via the applied adhesive with the release liner 38 by conducting the two members through contiguous paths 49 and passing the two members through a pair of pressure rolls 50.

The foil member-release liner composite exits station 46 and from there passes through printing stations 56, 58, 60 and 62. Each of the printing stations is equipped with an internal dryer 70, 72, 74 and 76, respectively, in the illustrated embodiment. In a typical printing operation, a separate printing tower is provided on the manufacturing line for each color to be printed and the foil member passes through the various tower sequentially. In the embodiment illustrated in FIG. 4, the printers are screen-belt printers such as the screen-belt printers manufactured by Beltograph of Mineola, N.Y. Those skilled in the art will appreciate, however, that the present invention is not limited to screen-printing or a screen-belt printing in particular. The foil member may also be printed by flexographic printing, offset printing, or gravure printing. The preferred printing means is an automatic screen printing means such as a screen-belt printer, a flat bed screen printer, a cylinder screen printer, or the like. Where more than one color is applied to the foil member, these operations must be conducted in registry with as little color overlap as possible. In FIG. 4, each of the screen-belt printers 56, 58, 60 and 62 comprises a roll 64 which supports the foil member assembly in contact with a screen-belt 66 through which a screen printing ink is applied to the upper surface of the foil member 36 in cooperation with a squeegee 68.

While the invention is illustrated with a continuous printing means, discontinuous means such as a flat bed screen printer can also be used. In such embodiments, the foil member is moved to a predetermined position, stopped, printed and dried, and moved to the next location which, in most cases, will be another flat bed printer. Cylinder screen and screen-belt printing as illustrated in FIG. 4 are advantageous because printing can be conducted on a continuous basis as the foil member moves along the apparatus, but it is more difficult to conduct these operations in registry.

In accordance with the present invention, following printing, the foil member is embossed to provide a three-dimensional effect to the printed design. This operation is carried out at station 78 wherein embossing is illustrated using a conventional embossing roll 80. This operation can, however, be conducted using an embossing plate or bed as well. The action of the embossing means is coordinated with the printing operation such that the embossment is in registry with the pre-printed decorative patterns on the surface of the foil member.

Having formed the graphic on the surface of the foil member 36, it is necessary to cut the foil member in registry with the graphic to form a foil shape. This operation is conducted at station 82 in FIG. 4. A convenient means of cutting the shapes from the foil member is a kiss-cutting device wherein the foil member is contacted with a kiss-cutting roll 84. After contacting the roll, the selvage is removed from around the foil shapes by a take-off roll 86. The kiss-cutting operation produces a foil shape having a sharply defined peripheral edge which, as discussed below, stops the flow of cast plastic. Following the cutting operation, the selvage bordering the foil shapes is removed by a take-off roll 86 which peels the selvage from the release liner 38 and leaves the foil shapes adhered to the release liner 38 upon which they are transported for further processing.

In accordance with one operation of the invention apparatus, the foil shapes are rolled on the release liner at take-off roll 88 for storage or the shapes can be assembled with the base member at this stage. As an alternative to taking the shapes off in a roll, the foil shapes may be stored in sheets. In this case, the invention apparatus is equipped with a sheeter 90 which cuts the release liner into sheets which are carried to the tray 92 where they are collected.

As a third alternative, the foil shapes are transported on the release liner 38 to a station 94 wherein they are coated with a clear fluent plastic material. In accordance with the preferred embodiment of the invention, the plastic is cast onto the foil shapes from casting heads 96 which are equipped with a plurality of closely spaced orifices or tubes 98. It has been found that by casting the plastic from a plurality of tubes or orifices, the separate plastic deposits meld on the surface of the shape and flow to the sharply defined peripheral edges thereof. Under appropriate conditions, the plastic stops at the sharply defined peripheral edges and forms a positive meniscus. This gives the plastic coating radiused edges and provides a lens effect to the underlying decorative pattern. Conditions for forming a positive meniscus are a function of the viscosity of the coating composition and the amount and manner in which it is applied to the foil shapes as described in U.S. Pat. No. 4,100,010 to Waugh. The casting station is provided with means generally indicated at 98 for metering the cast plastic delivered to the casting head and the foil shapes. A preferred plastic for use in the invention apparatus is polyurethane. While the invention is illustrated in FIG. 4 as forming a single line of foil shapes from the foil member 36 it will be evident that an array of shapes can be formed just as easily and in most cases a plurality of shapes will be formed across the foil member.

Immediately following the application of the cast plastic to the foil shapes, the plastic coating is cured or otherwise hardened at station 100. Various conventional curing and/or drying means can be used in conjunction with the invention apparatus including but not limited to ovens, infrared heaters, UV lamps, RF generators, and the like. In some cases an "ambient cure" can be effected by the exothermic heat of the curing reaction. For example, in the case of a polyurethane composition sufficient catalyst can be added to the composition to trigger the exotherm which drives the polymerization reaction to completion. The curing means use will depend upon the nature of the plastic, the preferred curing means being one which most effectively accommodates the apparatus and efficiently cures the plastic.

Downstream of the casting station 94 and the curing station 100, the invention apparatus is optionally equipped with a dye cutter 102 for cutting the release liner into sheets for shipment. For example, in accordance with this embodiment of the invention apparatus, the apparatus may be used to form decorative emblems which are used directly without assembling them with a bezel. For example, when the invention apparatus is used to produce the flexible body side molding illustrated in FIG. 3, there is no assembly with a bezel and, as such, the emblems or mouldings leaving the cure station 100 are in a form suitable for shipment. Accordingly, in these embodiments of the invention, the release liner need only be cut into sheets or the strips and the emblems, mouldings, or the like can be shipped directly to a distributor for repackaging or to an automobile or appliance manufacturer for application.

In accordance with another embodiment of the invention, the apparatus is equipped with means for assembling the decorative plastic cast emblems with a bezel. In accordance with this embodiment, the die cut station 102 is bypassed, and the emblems are stripped from the release liner by a stripper element 104 and the release liner is collected on a separate take-off roll 106. Having stripped the plastic-cast shapes from the release liners, the shapes are assembled with a bezel or other base element at station 108. The assembled shapes are then collected, as shown at 110.

In another embodiment of the invention, foil shapes collected at 88 or 92 may be stripped from the release liner and directly inserted into the channel or cavity in a bezel or base member. In accordance with this embodiment of the invention, the assembly may be returned to the apparatus at the casting station 94 where the plastic is cast directly onto the foil shape in the base member such that the plastic fills the channel or cavity in which the foil shape is retained and thereby encapsulates the foil shape within the base member. In this embodiment it is important that the foil member be selected such that it can be peeled from the release liner and inserted into the base member automatically. In some cases, depending upon the nature of the foil member, it may simplify handling and insertion to use a relatively thick gauge member. Also, where the foil members is sufficiently thick, it is possible to manufacture shapes without coating the bottom of the foil member with an adhesive. In this case, a relatively thick foil member is easily retained within the bezel or base member and the plastic encapsulates the foil member and fixes it to the base member.

It will also be evident that the take off roll 88 and the collection tray 92 located at midstream within the invention apparatus introduces a large degree of flexibility into the operation of the apparatus. In particular, minor backups in processing due to delays or downtime can be compensated without necessarily shutting down the entire apparatus. It also provides a point of takeoff and entry into the apparatus whereby a foil member can be preprinted and coated with adhesive and easily stored prior to coating with plastic as well as a point at which stored pre-printed foil members can be re-introduced to the apparatus. Thus, should it become necessary to interrupt a particular run of the apparatus, it may be possible to replace one pre-printed foil member with another without incurring substantial downtime.

Where the foil shape is coated in the base member, the use of plural orifices is not as critical and may be omitted since the walls of the cavity or channel retaining the foil shape adequately stop the flow of the cast plastic. For this operation, the viscosity of the plastic composition can also be lower. Coating the foil shapes directly, on the other hand, requires a somewhat higher viscosity plastic which limits the ability of the plastic to flow and form a uniformly thick coating and, for this reason, coating from a plurality of closely spaced and appropriately oriented orifices is recommended such that at the higher viscosity cast plastic deposits flow together and produce a uniform coating.

With appropriate adaptations, the invention apparatus can be used to manufacture a variety of decorative inlays and shapes including emblems, medallions and body side mouldings. Such elements have a variety of uses in addition to automobile decor.

The packaging operation 110 will vary with the particular foil shape product. As previously mentioned, however, in one embodiment soft flexible caps are formed. Thus, in one embodiment packaging may consist of die cutting the release liner into sheets and boxing the sheets carrying the plastic capped shapes for shipment. Otherwise, packaging may involve means for collecting the shapes assembled with the base members.

Having described the invention in detail and by reference to specific embodiments thereof, it will be appafent that numerous changes and modifications are possible without departing from the spirit and scope of the appended claims.

What is claimed is:

1. An apparatus for forming foil shapes cast with a plastic cap in which a continuous foil member of indefinite length is advanced along a horizontal path, comprising:

(a) means for advancing a continuous foil member along a horizontal path, (b) means for cleaning and priming at least one surface of said foil member, (c) means for providing an ådhesive composition on one surface of said foil member, (d) means for attaching a continuous release liner of indefinite length to the surface provided with adhesive, (e) means for printing one surface of said foil member with a plurality of decorative patterns in one or more colors, (f) means for embossing said foil member in registry with said decorative patterns, (g) means for cutting foil shapes from said foil member in registry with said decorative patterns and removing selvage, (h) means for casting a clear fluent plastic material onto said foil shapes to produce plastic capped shapes, and (i) means for curing or otherwise hardening said plastic wherein said means (a)-(g) act on said continuous foil member and said means (h) and (i) act on said shapes on said continuous release liner.

2. The apparatus of claim 1 wherein said means (i) comprises a source of ultraviolet light.

3. The apparatus of claim 1 wherein said means (e) comprises silk screen printing means.

4. The apparatus of claim 1 wherein said means (c) comprises means for spray coating one surface of said foil member with adhesive and said means (d) comprises means for aligning said foil member and said release liner and conducting said foil member and release liner in contact through at least one set of pressure rolls.

5. The apparatus of claim 1 wherein said means (g) comprises means for kill-cutting said foil shapes and removing selvage from said release liner.

6. The apparatus of claim 1 wherein said means (h) comprises a casting head equipped with a plurality of applicator orifices.

7. The apparatus of claim 6 wherein said means (h) dispenses plastic onto said foil shapes such that said plastic flows to the edge of said shape and stops and forms a positive memiscus.

8. An apparatus for forming foil shapes cast with a plastic cap in which a continuous foil member is advanced along a horizontal path comprising:

(a) means for advancing a continuous foil member along a horizontal path,
(b) means for cleaning and priming at least one surface of said foil member,
(c) means for providing an adhesive composition on one surface of said foil member,
(d) means for attaching a continuous release liner of indefinite length to the surface provided with adhesive,
(e) means for printing one surface of said foil member with a plurality of decorative patterns in one or more colors,
(f) means for embossing said foil member in registry with said decorative patterns,
(g) means for cutting foil shapes from said foil member in registry with said decorative patterns and removing selvage,
(h) means for casting a clear fluent plastic material onto said foil shapes to produce plastic capped shapes,
(i) means for curing or otherwise hardening said plastic, and
(j) means for stripping said plastic capped foil shapes from said release liner and means for assembling said foil shapes with a base member wherein said means (a)-(g) act on said continuous foil member and said means (h) and (i) act on said shapes on said continuous release liner.

9. The apparatus of claim 8 wherein said means (e) comprises silk screen printing means.

10. The apparatus of claim 9 wherein said means (c) comprises means for spray coating one surface of said foil member with adhesive and said means (d) comprises means for aligning said foil member and said release liner and conducting said foil member and said release liner in contact through at least one pair of pressure rollers.

11. The apparatus of claim 10 wherein said means (g) comprises means for kiss-cutting said foil shapes and removing the selvage from said release liner.

12. The apparatus of claim 11 wherein said means (h) comprises a casting head equipped with a plurality of applicator orifices.

13. The apparatus of claim 12 wherein said means (i) comprises a source of ultraviolet light.

14. The apparatus of claim 13 wherein said means (h) includes means for dispensing plastic onto said foil shapes such that said plastic flows to the edge of said shape and stops and forms a positive meniscus.

* * * * *

UNITED STATES PATENT AND TRADEMARK OFFICE

CERTIFICATE OF CORRECTION

PATENT NO. : 4,460,429

DATED : July 17, 1984

INVENTOR(S) : Charles M. Coscia & W. Raymond Wirick

It is certified that error appears in the above-identified patent and that said Letters Patent is hereby corrected as shown below:

Col. 8, line 17, "appafent" should be --apparent--.

Col. 8, claim 5, line 2, "kill-cutting" should be --kiss-cutting--.

Col. 9, claim 7, line 4, "memiscus" should be --meniscus--.

Signed and Sealed this

*Eighteenth* Day of *December 1984*

[SEAL]

*Attest:*

GERALD J. MOSSINGHOFF

*Attesting Officer* *Commissioner of Patents and Trademarks*